United States Patent Office 3,038,142
Patented June 5, 1962

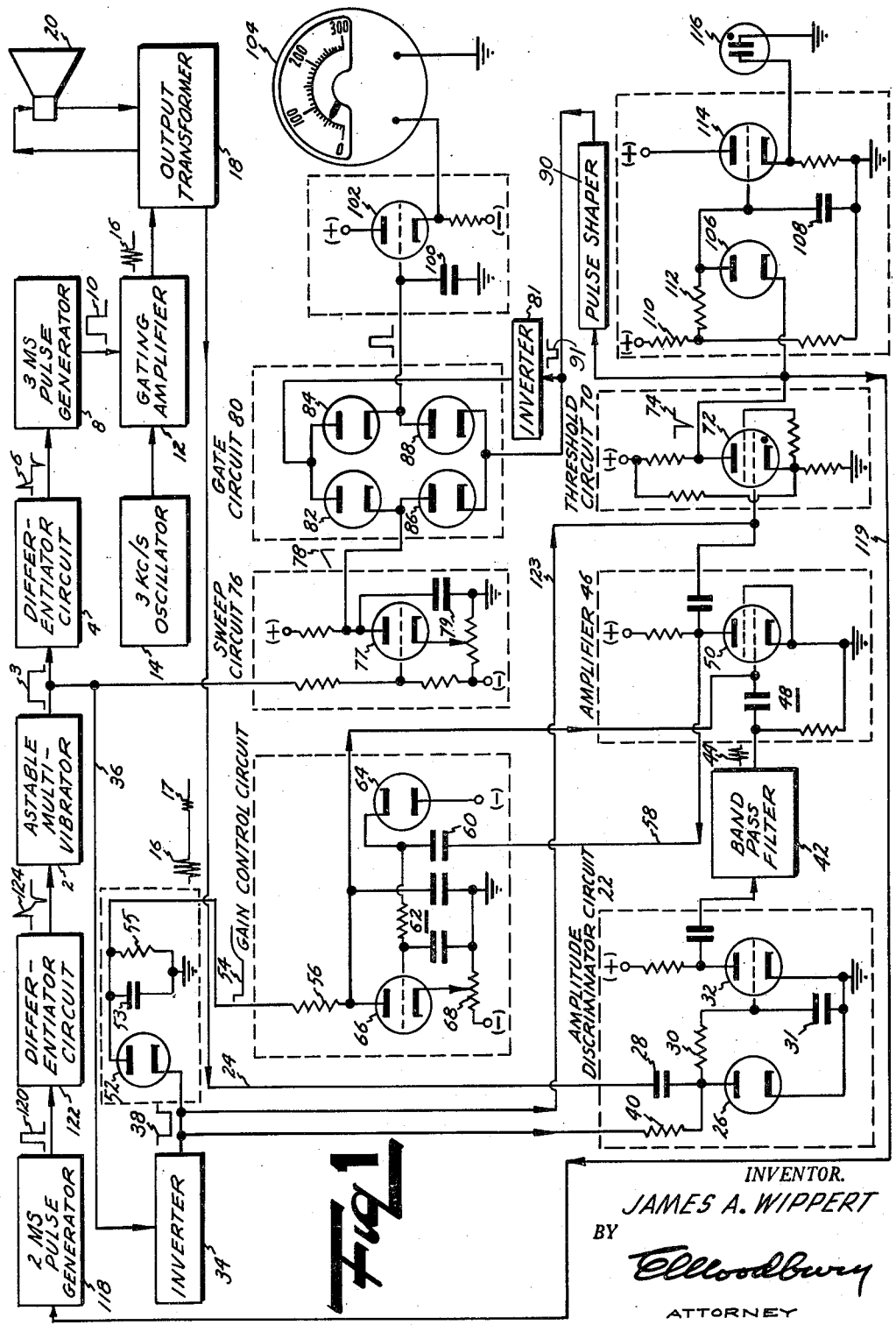

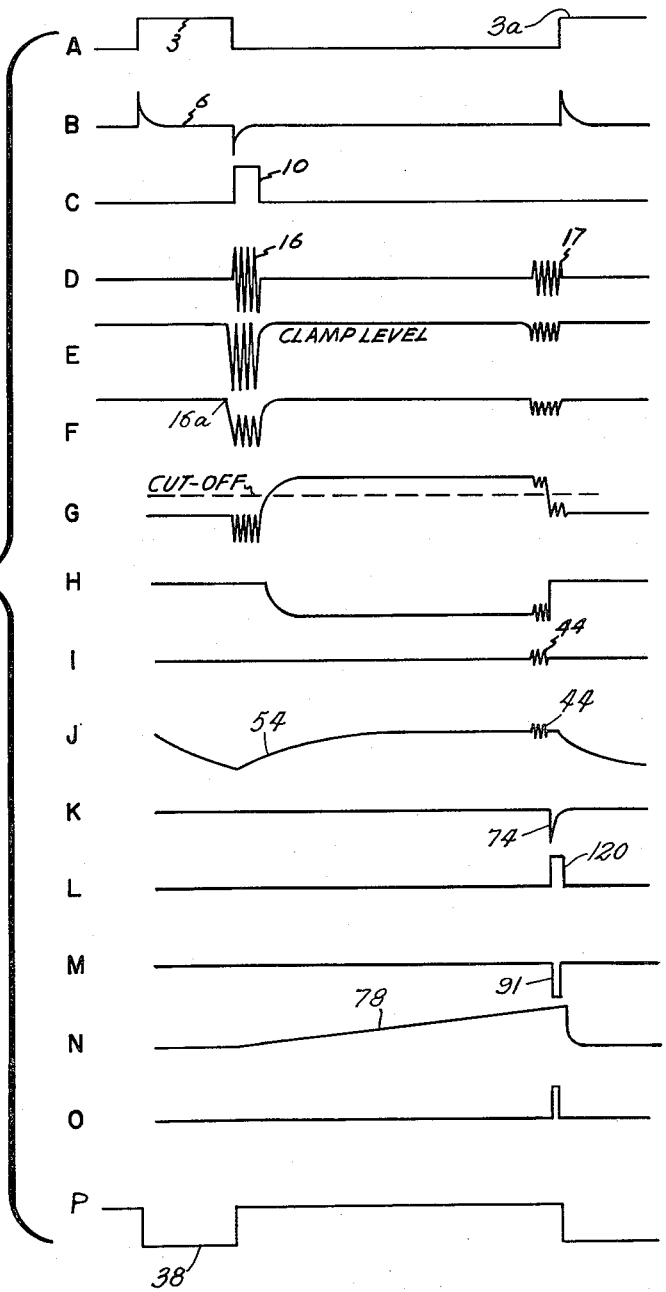

3,038,142
SONIC ALTIMETER
James A. Wippert, Burbank, Calif., assignor to The Bendix Corporation, a corporation of Delaware
Filed Dec. 20, 1955, Ser. No. 554,203
10 Claims. (Cl. 340—1)

This invention relates to sonic altimeters for measuring distances by means of sound waves.

All aircraft must fly near the ground during take-off and landing, and certain types of aircraft, such as helicopters, often operate near the ground for extended periods. For safe near-ground operations, an aircraft pilot must have an accurate and continuous knowledge of altitude relative to ground level. Under ordinary conditions, visual judgments of distance by a skilled pilot may be sufficient, but variations in topography may make visual judgment of distances difficult. In addition, weather conditions sometimes make visual observations impossible. A need thus exists for a system which measures and indicates the altitude of an aircraft relative to ground. Difficulty has been encountered in the use of barometric and radio type altimeters to obtain sufficient accuracy at low altitudes. It has therefore been proposed to utilize sound waves to measure low altitudes by transmitting a sound wave and observing the time required for an echo to return. Certain sonic altimeters in the past have been bulky, and greatly affected by random noises. Other sonic altimeters, and distance measuring devices utilizing sound waves, have often required that certain functions be manually performed.

Briefly, the present invention is a system for measuring distance by transmitting a sound wave, and timing the interval required for an echo to return to the point of origin. The system incorporates noise-eliminating features which operate on a frequency selective basis, and also render the system immune to noise which may be expected during certain portions of the operating cycle. The operation of the system is substantially continuous, such that when one measurement is completed, the taking of another measurement is automatically initiated.

An object of this invention is to provide an improved system for measuring distance.

Another object is to provide simple and effective apparatus for suppressing strong alternating signals while passing weak alternating signals.

Another object is to provide a simple and effecting apparatus in an echo distance-measuring system for indicating distance by a meter reading.

Another object is to provide an echo distance-measuring apparatus having greater immunity to noise signals.

Another object is to provide an echo distance-measuring apparatus which rapidly and automatically makes successive distance measurements.

Other and incidental objects and features of the invention will appear from the following description with reference to the drawings.

FIG. 1 is a schematic block and circuit diagram of a system incorporating the invention.

FIG. 2 shows waveforms of signals occurring a various points in the system of FIG. 1 during operation.

Referring now to FIG. 1, there is shown an astable multivibrator 2 that, when not externally controlled, swings from one state to another to generate a positive voltage pulse 3, of 100 milliseconds duration, every second. The multivibrator 2 may be triggered to shorten the one second interval and thereby cause the 100 millisecond pulse to be generated after an interval of less than one second. The astable multivibrator 2 may be of the type shown and described beginning on page 171 of volume 19 of the Radiation Laboratories Series entitled "Waveforms," published by McGraw-Hill. The waveform from the multivibrator 2, including the pulse 3, is shown in FIG. 2A.

The multivibrator 2 is coupled to a differentiator circuit 4 wherein the pulse 3 is differentiated to form a differentiated signal 6 comprising positive and negative pulses. The differentiator circuit 4 may consist simply of a series capacitance-resistance circuit to ground, with an output taken across the resistance. The waveform of the signal from the differentiator circuit 4 is shown in FIG. 2B.

The negative pulse portion of the differentiated signal 6 causes a pulse generator 8 to form a positive pulse 10 of three milliseconds duration. The positive pulse 10 from the pulse generator 8 is shown in FIG. 2C. This pulse 10 is applied to a gating amplifier 12 to control the passage of signals through it. The gating amplifier 12 is connected to an oscillator 14 delivering oscillations having a frequency of three kilocycles per second. The output from the gating amplifier 12 thus consists of a burst signal 16, as shown in FIG. 2D, of three kilocycles having a duration of three milliseconds. The burst signal 16 is applied to an output transformer 18 which is in turn coupled to a transducer 20. The transducer 20 may consist of a sound-forming device wherein a diaphragm is vibrated at the frequency of the burst by electromagnetic or other means.

It may therefore be seen that the above described transmitting portion of the system generates a three kilocycle sonic burst of three milliseconds duration. This sound energy after being transmitted may strike an object, forming an echo which will be reflected back to the transducer 20. Such an echo upon arriving at the transducer 20 will cause an electrical echo signal to be formed coinciding in form to the echo. The echo signal is applied through the output transformer 18 and over a line 24 to an amplitude discriminating circuit 22 and then to the remainder of the receiver portion of the system.

Means must be provided for disabling the receiver portion of the system during the time when the sonic burst is transmitted, since the line 24 connecting the output transformer 18 to the ampltiude discriminator circuit 22 carries not only the echo signal but also the transmitted burst signal. The waveform of the signal appearing on the line 24 is shown in FIG. 2D, including the transmitted burst signal 16 and the received echo signal 17.

The function of the amplitude discriminator circuit 22 is to preserve the echo signal and eliminate the burst signal. The circuit 22 must, therefore, pass an alternating signal of a low amplitude and prevent passage of an alternating signal of a higher amplitude.

At the time when the signal in line 24 begins to go positive, the plate of a diode 26 will be driven positive, through a capacitor 28, causing the diode 26 to pass a current and charge the capacitor 28. This charging action is rapid due to the low resistance of the diode 26. Now at a time when the signal in line 24 begins to go negative, the diode will not conduct, and presents a high resistance to the negative-going signal. The capacitor 28 will, however, have been sufficiently charged to clamp the positive peaks of the signal at essentially zero potential. The waveform of such a clamped signal is shown in FIG. 2E, as it would appear at the plate of the diode 26 to be applied through the resistor 30 to the grid of a vacuum tube 32, in the absence of any applied direct potential through a resistor 40, to be discussed later. A capacitor 31 connects the grid of the vacuum tube 32 to ground. The resistor 30 and the capacitor 31 form a circuit to attenuate alternating current signals, to form signals as shown by the waveform of FIG. 2F.

In the waveform of FIG. 2F, it may be seen that echo signals attain higher voltage levels than the transmitted burst signals; therefore, amplitude selection may be now effected to preserve the echo signals and eliminate the transmitted burst signals. Such amplitude selection is effected by the vacuum tube 32 which has a cut-off level below the base (negative-going limit) of the echo signal, but above the peak positive-going amplitudes of the transmitted signal.

As indicated by FIG. 2F, the beginning of the transmitted signal applied to the grid of the vacuum tube 32 from the attenuating resistance 30 and capacitance 31 would be a sharp negative-going direct-current pulse starting at the shoulder 16a above the cut-off level. Such a pulse would cause ringing in frequency selective circuits positioned further into the receiver system, and should therefore be eliminated. The effect of this sharp pulse is eliminated as follows: The 100 milliseconds pulse 3 generated by the astable multivibrator 2 is applied to an inverter circuit 34 via a line 36. The inverter circuit 34 serves to invert the 100 millisecond pulse to form a negative-going pulse 38 (FIGS. 1 and 2P). The negative-going pulse 38 is applied through the resistor 40 and the resistor 30 to the grid of the vacuum tube 32. The composite signal received at the grid of the vacuum tube 32 is shown in FIG. 2G. It will be observed that the negative pulse 38 reduces the potential of the grid of the tube 32 below cut-off before the transmitted burst is applied thereto, so that the sharp pulse or surge at the beginning of the burst does not get through the tube.

It will also be noted that in FIG. 2G the received echo signal is divided into two sections, the first above, and the last below, the cut-off level. The reason for this is that the first portion of a received echo triggers the transmission of the next burst, in a manner to be explained later, and the next 100-millisecond negative pulse 38 occurs before the echo pulse is completed.

Considering the cut-off level of the tube 32 as shown in FIG. 2G, it may be seen that a voltage will be applied to the grid of the vacuum tube 32 which consists of recovery to normal operating level of the tube plus the echo signal. The waveform of the potential developed at the plate of tube 32 in response to such a signal is shown in FIG. 2H.

The signal from the plate of the tube 32 is applied to a band-pass filter 42 wherein the direct current component is eliminated, along with other, noise, signals which do not approach a value of three kilocycles. Ideally, the output from the band-pass filter 42 contains only the short duration echo signal 44 representing the received echo, as shown in FIG. 2I. This echo signal 44 is applied to an amplifier 46, by means of a coupling circuit 48 which couples the filter 42 to a control grid of a vacuum tube 50. The grid of the vacuum tube 50 also receives other signals which are utilized to effect automatic gain control and time varied gain in the amplifier stage 46.

The strength of the echo signal when received will vary inversely with the distance travelled by the sound waves and hence with the time lapsing between transmitting sound and receiving an echo. The gain of the amplifier acting upon the echo signal is therefore time varied to compensate for the variation in echo signal strength. To effect such compensation, immediately after the transmission of the sonic burst the grain of the amplifier 46 is relatively low, and then increases with time to provide more gain for attenuated signals. Biasing of the tube 50 to effect this varying gain is accomplished in the following manner. The negative-going 100 millisecond pulse 38, from the inverter circuit 34, is applied to a diode 52. The diode 52 is in turn connected to a grounded resistor 55, a grounded condenser 53 and a resistor 56. The lagging edge of the negative-going pulse 38 substantially coincides in time with the transmission of the sonic burst 16 (FIGS. 2D and 2P). The negative-going pulse 38 will charge the condenser 53 through the diode 52. With the occurrence of the lagging edge of the pulse 38, the condenser 53 will begin to discharge exponentially through the resistor 55 to form an exponentially decreasing negative pulse 54. The pulse 54 is applied through the resistor 56 to the grid of the vacuum tube 50. It may therefore be seen that during the interval after transmission of a sonic burst, the control grid of the vacuum tube 50 will receive a negative voltage which gradually decreases in amplitude. Such a voltage, with the echo signal 44 from the band pass filter 42, is shown in FIG. 2J, and represents the voltage applied to the grid of the vacuum tube 50 during the cycle of operation following transmission of the burst 16 in FIG. 2D.

The time-varied gain nearly disables the operation of the vacuum tube 50 during a brief interval immediately following the time when the sonic burst is transmitted. This brief interval occurs during the time when echoes would be received from protuberances upon the aircraft carrying the altimeter.

The amplifier 46 is also utilized for automatic gain control. The output signal appearing at the plate of the vacuum tube 50 is applied by means of a line 58 through a capacitor 60 to a resistance-capacitance circuit 62 and to the cathode of a diode 64. The anode of diode 64 is connected to a source of negative potential. Noise signals appearing at the plate of the vacuum tube 50 of magnitude in excess of the normal potential acoss the diode 64 render the latter conductive to increase the negative charge on the grid of a vacuum tube 66. The vacuum tube 66 acts as an automatic-gain-control amplifier, and voltages appearing at its plate are directly applied to the grid of the vacuum tube 50, to compensate for variations in the noise output from the tube 50. The resistance-capacitance circuit 62 effects a brief delay in automatic grain control, such that the echo signal, when received, is not eliminated by the automatic gain control circuits. The resistance 56 is provided to prevent automatic gain control voltages generated at the plate of the tube 66 from affecting the integrating circuit 52.

The vacuum tube 66 serving as the automatic gain control amplifier is provided with a variable cathode bias, by means of a potentiometer 68, which is connected between ground and a source of negative potential. The variation in cathode bias of the tube 66 is utilized to adjust the level at which automatic gain control action starts to take place.

Upon receiving the echo signal 44, the vacuum tube 50 amplifies the echo signal and applies it to the grid of a thyratron 72 of a threshold circuit 70. The thyratron 72 upon receiving a positive signal upon its grid will be driven into conduction for an instant to form a negative pulse 74 at its plate. The pulse 74 is indicative of a received echo signal.

The timing system, to determine the time lapse between the instant when the sonic burst is transmitted, and the instant when the echo is received, will now be considered. The 100 millisecond pulse 3 from the astable multivibrator 2 is coupled to a sweep circuit 76. The sweep circuit 76 consists of circuitry for forming a linearly increasing saw tooth voltage initiated by the trailing edge of the positive pulse 3. The sweep generator 76 contains a vacuum tube 77 for discharging a capacitor 79 during the interval of the pulse 3 when the tube 77 is rendered conductive. The capacitor 79 then gradually charges and in doing so generates a sweep voltage 78 as shown in FIG. 2N. The sweep voltage 78 generated by the sweep generator 76 is applied to a gate circuit 80. Also applied to the gate circuit 80 through a pulse shaper circuit 90 directly, and through the pulse shaper circuit 90 and a signal inverter circuit 81, are pulses derived from pulse 74. The pulse shaper 90 produces a negative-going rectangular pulse 91 of about one millisecond duration, as shown in FIG 2M. The gate circuit 80 is of a type wherein at the instant when the pulses from the pulse shaper 90 and the inverter 81 are applied, the voltage level currently appearing on the capacitor 79 will be passed on to set a storage condenser 100 at the same voltage level.

The gate circuit 80 contains diodes 82, 84, 86, and 88. These diodes are normally so biased by the output of the pulse shaper 90, and the output of inverter 81, that the plates are negative with respect to the cathodes. With the occurrence of the pulse 74 from the threshold circuit 70, the cathodes of the diodes 86 and 88 are driven negative with respect to the plates by the pulse 91, and the plates of the diodes 82 and 84 are driven positive by the inverted pulse from inverter 81. The occurrence of the pulse 74 therefore causes the plate of each of the diodes 82, 84, 86, and 88, to be driven positive relative to its cathode, to render all of the diodes conductive. If the voltage on the condenser 79 is more positive than the charge on the smaller storage condenser 100, then such a voltage will cause a current to pass through the diodes 82 and 84 to charge the storage condenser 100. In the event that the voltage on the condenser 79 is less positive than the voltage on the storage condenser 100, then the current path is through the diodes 88 and 86. In either event the voltage building up on the condenser 79 is sampled and stored on the condenser 100.

The output from the gate circuit 80 thus is a sample pulse of the sweep voltage, the magnitude of which is indicative of the time lapsed since the transmission of the sonic burst. The waveform of the sweep voltage 78 is shown in FIG. 2N. The waveform of the sampled signal passing through the gate circuit 80 is shown in curve O in FIG. 2. At the time when the gate circuit 80 is conducting, the storage condenser 100 is charged to the peak value of the sampled signal. The storage condenser 100 is not provided with a discharge path except through the gate circuit, and therefore the voltage applied to it during the gating interval is preserved and applied to the grid of a vacuum tube 102. The vacuum tube 102 is connected as a cathode follower, and the voltage applied to its grid is proportionally maintained at its cathode. The cathode voltage from the cathode follower 102 is then applied to an electrical meter 104 which measures such a voltage and is calibrated to indicate altitude.

Summarizing, with respect to the manifestation of altitude, an increasing sweep signal is initiated with the transmission of the sonic burst; the magnitude of the sweep signal is then sampled when the echo from the sonic burst is received. By reason of the fact that the sweep signal increases with time, the magnitude of the sample is a function of the time between the transmission of the sonic burst and reception of the echo. The magnitude of the sample is held or stored as a charge upon the storage condenser 100 and is applied by means of the cathode follower 102 to the meter 104. Altitude is thus indicated.

During certain intervals of operation, the aircraft carrying the altimeter may be above the range of the altimeter, and echoes will not be received. It is desirable that a pilot know when such conditions exist. When echo signals are received, the pulse 74 from the threshold circuit 70 will appear. These signals 74 are applied to the cathode of a diode 106. With the application of the negative-going signals 74 to the diode 106, the diode 106 will be rendered conductive, providing a discharge path for any voltage accumulated upon a capacitor 108.

At a time when no signals 74 occur, a charge will be accumulated upon the condenser 108 through the resistors 110 and 112 which are connected to a source of positive potential. The values of the capacitor 108, and the resistances 110 and 112 are so chosen that the capacitor 108 will require a time of several seconds to become sufficiently charged to render a vacuum tube 114 conductive. The vacuum tube 114 is connected as a cathode follower, and has its cathode connected to a neon light 116. It may therefore be seen that if several sonic bursts are transmitted, and no echoes are received, the capacitor 108 will become sufficiently charged to render the vacuum tube 114 conductive, causing a current to pass through and illuminate the light 116. The observer of the altimeter is thus informed that the sonic bursts of energy being transmitted are not being reflected back to the altimeter.

In the operation of a system of this type, it is desirable that measurements be repeatedly made in a rapid fashion. In this system, immediately after an echo is received, a cycle to produce another sonic burst is initiated. The manner of initiating such cycles is as follows.

The negative-going pulse 74 from the threshold circuit 70 is applied to a pulse generator 118 via a line 119. Upon receiving the negative-going pulse 74, the pulse generator 118 forms a positive-going pulse 120 of substantially two milliseconds duration. The two-millisecond-duration pulse 120 is applied to a differentiator circuit 122 to form a differentiated signal 124 having positive and negative voltage spikes. The negative portion of the differentiated signal 124, when applied to the astable multivibrator 2, causes the generation of another 100 millisecond pulse 3a (FIG. 2A), which will cause, as previously explained, the transmission of another sonic burst to effect another distance measurement. The combination of the 2-millisecond pulse generator 118 and differentiator 122 delays the generation of a new 100-millisecond pulse 3a (FIG. 2A) approximately 2 milliseconds, and insures that the rising sweep wave 78 (FIG. 2N) will not be terminated before the gate circuit 80 has reclosed; otherwise, the storage condenser 100 would be discharged with the condenser 79.

The 100 millisecond pulse 3a formed by the astable multivibrator 2 is, as previously explained, applied to the inverter circuit 34 to form a negative-going 100 millisecond pulse 38. The negative-going 100 millisecond pulse 38 is applied to the grid of the thyratron 72 via a line 123. This negative-going pulse causes the thyratron 72 to be rendered inoperative for approximately 100 milliseconds shortly after the echo pulse is received. The reason for this is that whereas the first echo pulse received is of interest, later echo signals which may be received are of no value and would create confusion. The application of the 100 millisecond negative-going pulse 38, to the grid of the thyratron 72, serves to prevent echo pulses occurring after the first echo from forming pulses 74.

It may therefore be seen that immediately after a sonic burst is transmitted, the circuit becomes disabled by the operation of the time varied gain control circuits. The interval immediately after an echo is received is also disqualified as a reception period, and echoes after the first are not sensed, due to the action of the thyratron 72 under the biasing influence of the negative going pulse 38.

At a time when no echoes are received, the astable multivibrator 2 will generate a pulse of 100 milliseconds approximately every second. In order for the generation of such a pulse, no triggering signal 124 is required. It may therefore be seen that when no echoes are received, a sonic burst will be sent out approximately every second automatically. And, when an echo is received, a sonic burst will be sent out immediately after the echo is received.

Although for the purpose of explaining the invention particular embodiments thereof have been shown and described, obvious modifications will occur to a person skilled in the art, and I do not desire to be limited to the exact details shown and described.

I claim:
1. An echo distance-measuring device comprising: means for transmitting bursts of traveling wave energy; detecting means for detecting echoes of said bursts; means responsive to each said detected echo for indicating the time lapse between the transmission of the burst producing said echoe and the reception of said echo; an indicator operable between first and second states indicating normal and abnormal conditions, respectively; time-delay control means connecting said detecting means to said indicator for actuating said indicator to its first state in response to each received echo and actuating said indicator to its second state after a predetermined interval following reception of an echo, said predetermined interval exceeding the time lapse between transmission of a burst and reception of an echo thereof at the maximum range of reception of said detecting means.

2. Apparatus according to claim 1 in which said predetermined interval is at least twice the time lapse between transmission of a burst and reception of an echo thereof at the maximum range of reception of said detecting means.

3. An echo distance-measuring device comprising: means for transmitting a burst of traveling wave energy; means for generating a varying sweep potential, and means for initiating the generation of said sweep potential simultaneously with the transmission of said burst; means for detecting an echo of said burst; a storage condenser; indicating means responsive to the potential on said storage condenser; and means actuated by said echo-detecting means for momentarily connecting said storage condenser to said generating means for storing on said condenser the potential existent on said generating means at the time of detection of said echo, said sweep potential generating means including a condenser large relative to the said storage condenser across which said sweep potential is generated, whereby connection of said storage condenser to said generating means varies the potential of the storage condenser more than the potential of the generating means, and said indicating means having such high impedance relative to the size of the storage condenser that the potential on the storage condenser is substantially unaffected by said indicating means.

4. Apparatus according to claim 3 including: means responsive to transmission of successive bursts for restarting said sweep potential from a low value with each burst; means responsive to the first echo following each burst for initiating transmission of a following burst, including time delay means for delaying transmission of said following burst and restarting of said sweep potential beyond said momentary connection of said storage condenser to said generating means.

5. In an echo distance-measuring system in which strong alternating signals are transmitted and weak alternating echo signals are received, and including receiving means exposed to both said strong and weak signals, apparatus in said receiving means for accepting said weak signals and rejecting said strong signals, comprising: clamping means for clamping peak values of said signals at a common level; attenuating means connected to said clamping means for attenuating said clamped signals; and amplitude-selective means connected to said attenuating means for passing only signals from said attenuating means having an amplitude above a predetermined level.

6. Apparatus according to claim 5 in which said attenuating means attenuates said signals to such degree that the peak level of the attenuated strong signal is below the base level of the attenuated weak signal, and said predetermined level is intermediate said peak and base levels.

7. Apparatus according to claim 6 including means for applying to said clamping means immediately prior to said strong signal a direct current pulse of amplitude below said predetermined level.

8. Apparatus according to claim 5 including: means for applying to said amplitude-selective means a biasing pulse of amplitude below said predetermined level immediately prior to said strong signal; detecting means normally responsive to alternating current signals but capable of being biased to cut-off; means including a filter connecting the output of said amplitude-selective means to said detecting means; and means for biasing said detecting means beyond cut-off for the duration of said biasing pulse, whereby said detecting device is rendered nonresponsive to transient potentials resulting from application of said biasing pulse to said amplitude-selective means.

9. An amplitude-discriminating circuit for passing relatively low amplitude-alternating signals, and for inhibiting the passage of relatively high amplitude-alternating signals comprising: clamping means responsive to both said low and high amplitude-alternating signals for clamping the peak values of all signals to a predetermined level; alternating signal-attenuating means connected to said clamping means for attenuating the alternating signals from said clamping means to form attenuated signals such that the positive peaks of said high amplitude signals are below the negative peaks of said alternating low amplitude signals; and amplitude-selective means for passing said attenuated signals of a magnitude above a second predetermined level that is intermediate the levels of the said positive peaks of attenuated high amplitude signals and said negative peaks of attenuated low amplitude signals.

10. A system for passing alternating signals below a predetermined amplitude and not passing alternating signals above said value comprising: clamping means for clamping to a predetermined level the positive peaks of alternating signals of amplitudes both above and below said predetermined amplitude to form clamped signals; alternating signal-attenuating means connected to said clamping means for attenuating said clamped signals sufficiently to reduce the positive peaks of signals above said predetermined amplitude below the negative peaks of signals below said predetermined amplitude; and amplitude-selective means for passing attenuated signals above a predetermined level connected to said attenuating means for selectively passing portions of said attenuated signals above said predetermined level of amplitude.

References Cited in the file of this patent
UNITED STATES PATENTS

| | | |
|---|---|---|
| 2,083,344 | Newhouse | June 8, 1937 |
| 2,333,688 | Shephard | Nov. 9, 1943 |
| 2,346,093 | Tolson | Apr. 4, 1944 |
| 2,371,988 | Granqvist | Mar. 20, 1945 |
| 2,502,454 | Greig | Apr. 4, 1950 |
| 2,798,153 | Dougherty | July 2, 1957 |